J. O. SHRINER.
Tea and Coffee Drawer.
No. 49,929.    Patented Sept. 12, 1865.
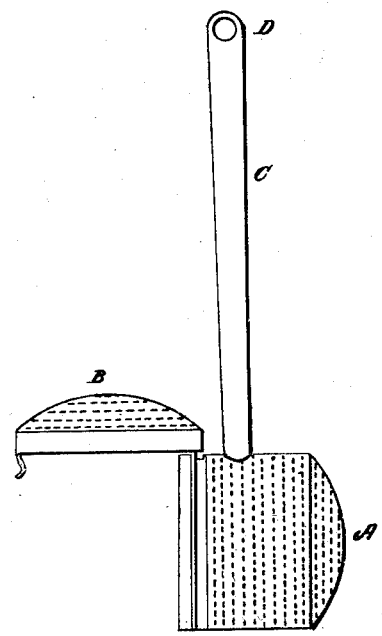
Witnesses:
L. Luchs.
H. S. Dulaney.
Inventor:
John O. Shriner
By his Atty:
J. Franklin Reigart.

UNITED STATES PATENT OFFICE.

JOHN O. SHRINER, OF NEW CASTLE, INDIANA.

COFFEE AND TEA DRAWER.

Specification forming part of Letters Patent No. 49,929, dated September 12, 1865.

*To all whom it may concern:*

Be it known that I, JOHN O. SHRINER, of New Castle, Henry county, State of Indiana, have invented a new and useful Tea and Coffee Drawer; and I do hereby declare that the following is a clear and exact description of the same, reference being had to the accompanying drawings, and to the letters of reference marked thereon, making a part of this specification The nature of my invention consists in a round, oval, or square shaped box, from two to three inches in diameter, which I call a "tea and coffee drawer," having a tightly-shutting lid, and the box and the lid being perforated. The object is to confine tea or ground coffee and boil it in a kettle, so that the tea or coffee shall be clear and free of grounds, dispensing with the use of eggs, clarifying, and other ingredients to clear and settle the tea and coffee for an agreeable drink.

A represents the box, made of silver, tin, or proper metal, or any proper wire-gauze, having a tight and closely fitting lid, B, to inclose tea or coffee, and the whole being perforated, that the boiling water may pass throughout the box freely and boil the tea or coffee and the tea or coffee not escape from the box, but all their strength imparted to the water.

A handle, C, is attached to the box, so that the box can be lowered to the bottom of a kettle, in the boiling water, and can be withdrawn at any time when the strength of the tea or coffee has all been extracted.

A ring, D, at the end of the handle is for the purpose of more easily inserting the drawer or withdrawing it from the boiling water, and the herbs, tea, or coffee can be put into the kettle with cold water and their essence extracted during the boiling of the water, the strength being compelled to pass through the body of the water before getting to the top to evaporate. Another object of this handle C is to keep the drawer from floating to the top of the water that otherwise would; but the lid of a water-pot shuts down on the end of the handle C and prevents the drawer from rising.

I do not claim a perforated or wire strainer to be suspended to the nozzle or set on top of a tea or coffee pot for the purpose of straining or clearing boiled tea, coffee, or herbs; but

What I claim as my invention, and desire to secure by Letters Patent, is—

A perforated or wire drawer, made of any proper shape, having a closely-fitting perforated lid and a long handle with a ring on the end, for the purposes herein set forth.

JOHN O. SHRINER.

Witnesses:
MARTIN L. POWELL,
WM. F. WALKER.